United States Patent [19]

Oikawa

[11] Patent Number: 5,665,948
[45] Date of Patent: Sep. 9, 1997

[54] AUTOMOBILE KNOB SWITCH

[75] Inventor: Takahiro Oikawa, Tokyo, Japan

[73] Assignee: Niles Parts Co., Ltd., Japan

[21] Appl. No.: 628,300

[22] Filed: Apr. 5, 1996

[30] Foreign Application Priority Data

Apr. 11, 1995 [JP] Japan ................... 7-110060

[51] Int. Cl.$^6$ .................................... H01H 9/00
[52] U.S. Cl. ............................................ 200/61.54
[58] Field of Search ................... 200/61.54; 307/10.8

[56] References Cited

U.S. PATENT DOCUMENTS

| | | | |
|---|---|---|---|
| 3,499,125 | 3/1970 | Stoi | 200/61.54 |
| 3,511,943 | 5/1970 | Kibler | 200/4 |
| 3,704,446 | 11/1972 | Walter | 340/74 |
| 5,272,290 | 12/1993 | Suzuki et al. | 200/61.54 |
| 5,472,809 | 12/1995 | DuRocher et al. | 200/61.54 |

FOREIGN PATENT DOCUMENTS

| | | |
|---|---|---|
| 63-48913 | 1/1982 | Japan . |
| 5-21797 | 10/1988 | Japan . |

*Primary Examiner*—Stuart N. Hecker
*Attorney, Agent, or Firm*—Ronald P. Kananen

[57] ABSTRACT

An automobile knob switch assembly comprising an operating lever 1 that has a shaft rod 1a. A terminal plate 2 is inserted into an opening part if of the operating lever 1. A movable plate 3 has a movable contact plate 13 that contacts the stationary contact plates 8 placed in the terminal plate 2, a through hole 3a through which a cylinder part 4a of a moderator 4 is inserted, and latching pieces 3b that are latched onto the moderator 4. The moderator 4 has an elastic claw 4c that is latched onto the shaft rod 1a. A knob 5 has a latching part 5b that is engaged to a latching piece 3e formed in the periphery of the movable plate 3. A second embodiment is disclosed that has two knobs for the rotary switch installed at the tip of the operating lever 15. The construction of the knob switch assembly permits the parts of the switch assembly to be automatically assembled with machines for mass production and reduced costs.

12 Claims, 4 Drawing Sheets

AUTOMOBILE KNOB SWITCH

BACKGROUND OF THE INVENTION

1. Field of the Invention

The present invention relates generally to switch mechanisms and, in particular, to an automobile knob switch assembly that is placed at the tip of an operating lever of an automobile turn signal switch, for example.

2. Description of the Prior Art

An example of a conventional switch mechanism is described in Japanese Utility Model No. Hei 63-48913. The conventional mechanism described in this reference is a rotary switch having a shaft inserted into a case of an operating lever, and insulators, contact holders, and a knob inserted into a tip of the shaft and held with a snap ring. The opening part at the tip side of the knob is sealed with a cap.

Another example of a conventional switch mechanism is described in Japanese Utility Model No. Hei 5-21797. The conventional mechanism described in this reference has knobs of two rotary switches placed at the tip of an operating lever. The knob at the tip side of the operating lever is fitted onto the shaft with pins.

However, with the above-described conventional switch mechanisms, since insulators, contact holders, and knobs are placed on a shaft, snap rings or pins are needed, processability is poor, and a large number of parts and processing steps are needed.

SUMMARY OF THE INVENTION

An object of the present invention is to solve the aforementioned problems associated with the conventional switch mechanisms.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

In order to solve the problems in the prior art, an automobile knob switch of the present invention comprises an operating lever having a shaft rod, a terminal plate inserted into the opening part of the operating lever, a movable plate having a movable contact point that contacts the stationary contact plates placed on the terminal plate, a through hole through which the cylinder part of a moderator is inserted, and latching pieces with which the movable plate is latched onto the knob, the moderator having an elastic claw with which the moderator is fitted onto the shaft rod, and the knob having latching parts to which the latching piece of the movable plate is engaged.

An automobile knob switch of the present invention comprises a first terminal plate that has first stationary contact plates and is inserted into the opening part of the operating lever, a first knob having a first movable contact plate that contacts the first stationary contact plates, a stationary body that is fitted onto the shaft rod of the operating lever, a second terminal plate that has second stationary contact plates and is set on the stationary body, a movable plate that has a second movable contact plate that contacts the second stationary contact plates and latching pieces and is pivoted onto the shaft rod in a freely rotatable manner, a moderator claw having an elastic claw for latching onto the shaft rod, and a second knob having a latching part for latching onto the latching pieces of the movable plate.

Furthermore, a moderator of the present invention has a rotation prevention protruded part in the cylinder part into which the shaft rod is inserted, the terminal plate or the second terminal plate has code wires connected either to the first stationary contact plate or to the second stationary contact plate, the shaft rod has grooves, and the rotation prevention protruded part and the code wires are inserted into the grooves.

BRIEF DESCRIPTION OF THE DRAWINGS

The present invention will become more clearly appreciated as the disclosure of the present invention is made with reference to the accompanying drawings. In the drawings.

DETAILED DESCRIPTION OF THE INVENTION

Figure 1:
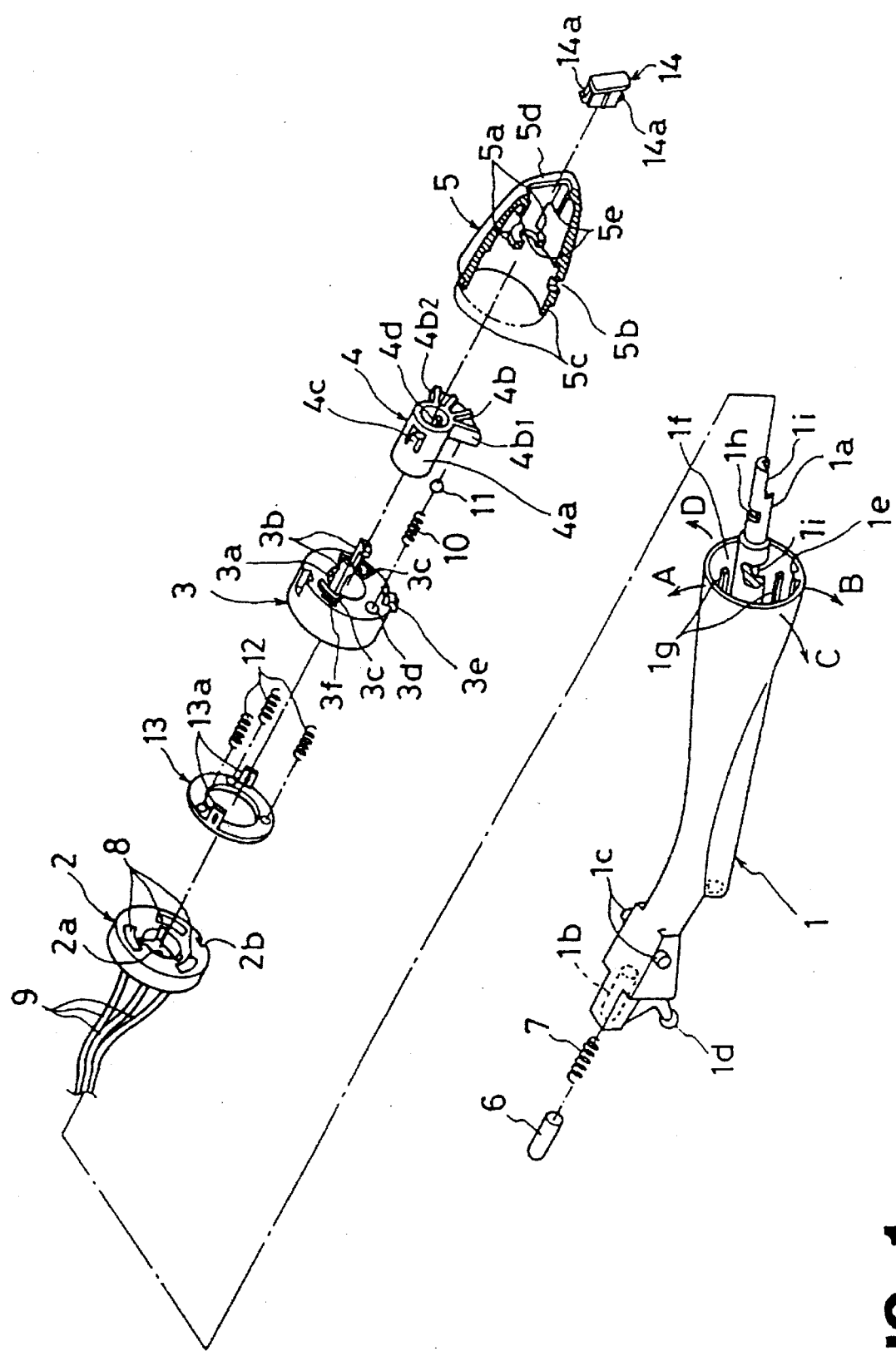
FIG. 1 is an exploded perspective view of component items of a first embodiment of the present invention.
Figure 2:
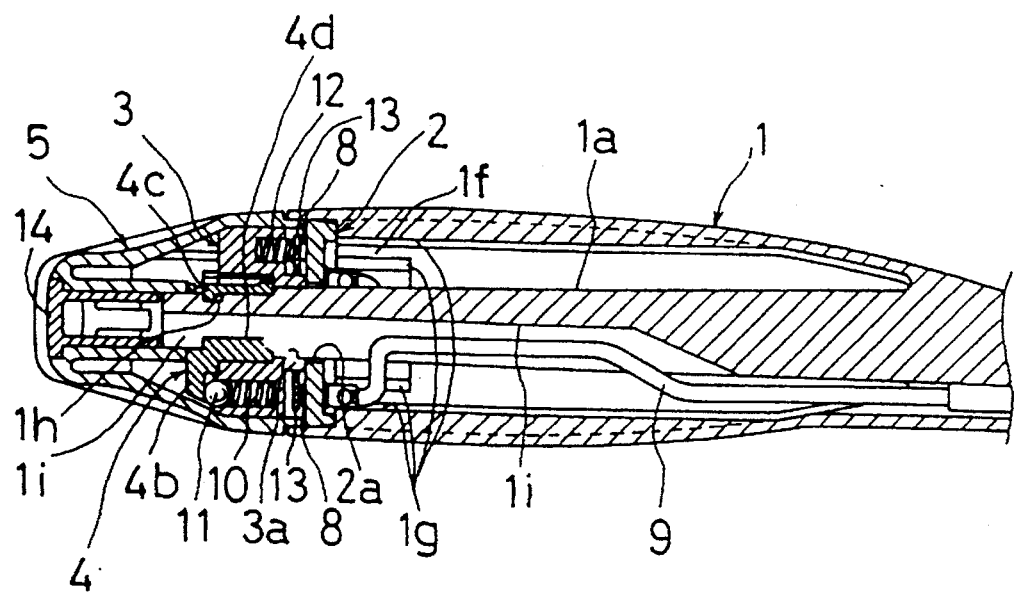
FIG. 2 is an enlarged cross-sectional diagram showing the first embodiment of the present invention.
Figure 3:
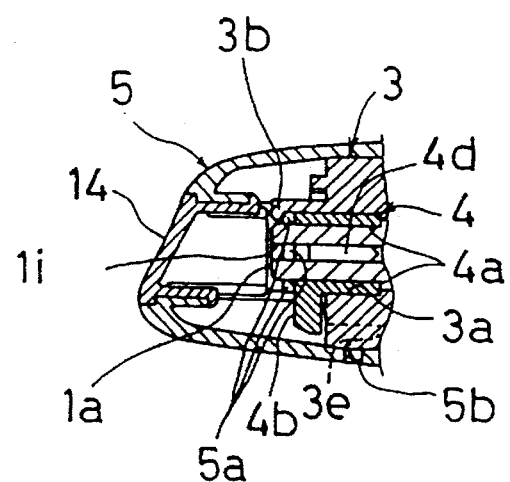
FIG. 3 is an enlarged cross-sectional diagram showing the knob assembly of the first embodiment of the present invention.
Figure 4:
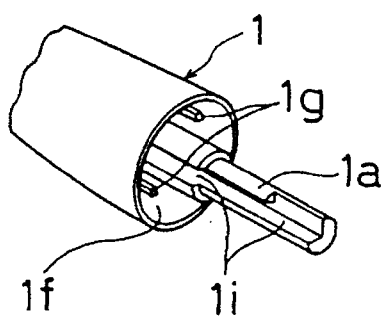
FIG. 4 is an enlarged perspective view showing the groove on the shaft rod of an operating lever of the first embodiment of the present invention.

A first embodiment of the present invention will be described in detail hereinafter with reference to FIGS. 1 to 4 of the accompanying drawings.

In the first embodiment of the present invention, a knob 5 comprising one rotary switch is placed at a tip of an operating lever 1.

The operating lever 1 is, for example, an operating component of a turn signal and dimmer switch of an automobile. From here on, in the first embodiment of the present invention, the operating lever 1 is regarded as an operating component of a turn signal switch and a dimmer switch. However, the operating lever 1 can also be used as an operating component of other automotive switches, such as a wiper switch.

A shaft rod 1a is placed on one end of the operating lever 1, on which a terminal plate 2, a movable plate 3, a moderator 4, and a knob 5 are set. A blind hold 1b is formed at the other end of the operating lever 1, to which a moderating pin 6 and a coil spring 7 are inserted. The shaft rod 1a is protruded from the center of the trumpet-shaped operating lever 1. An axis 1c, which is fit onto a rotating body (not shown in the figures), and an operating rod 1d, which is engaged to movable plates (not shown in the figures) of a turn signal switch and a dimmer switch, are placed in the vicinity of the blind hole 1b. A groove 1i is formed on the shaft rod 1a (at its lower part), through which the code wires 9 and the rotation prevention protruded part 4d are inserted. The operating lever 1 can be rotated around the axis 1c in the direction indicated by arrow signs (A and B), and also can be rotated around the axis of the aforementioned movable body (not shown in the figures) in the direction indicated by arrow signs (C and D).

The doughnut-shaped terminal plate 2 has a hole 2a through which the shaft rod 1a is inserted. Stationary contact plates 8 are tightly fastened onto the front surface of the terminal plate 2. At its rear surface, code wires 9 are soldered onto the stationary contact plates 8. Rotation of the terminal plate 2 is prevented by engaging the rotation prevention notch 2b formed on the periphery of the terminal plate 2 with the protruded part 1e formed on the inside wall of the opening part if of the operating lever 1. When the terminal plate 2 is inserted into the opening part 1f of the operating lever 1, the rear surface of the terminal plate 2 is caught by the receiving seat 1g formed on the inside wall of the operating lever 1.

A doughnut-shaped movable plate 3 has a through hole 3a through which the cylinder part 4a of the moderator 4 is inserted. Two latching pieces 3b that latch onto the outer periphery of a ring-shaped latching part 5a installed inside the knob 5, stoppers 3c that engage side surfaces 4b1 and 4b2 of the moderator plate 4b of the moderator 4, and a blind hole 3d to which a spring 10 and a steel ball 11 are inserted are formed on the front surface of the movable plate 3.

A movable contact plate 13 is placed at the rear surface of the movable plate 3 via multiple contact springs 12. A latching piece 3e is formed on the periphery of the movable plate 3, which engages with the latching part 5b formed on the knob 5. The movable plate 3 has contact piece posting holes 3f prepared at the outside of the aforementioned stoppers 3c. The protruded pieces 13a of the movable contact plate 13 are fit onto these contact piece posting holes 3c. Claws (not shown in the figures) are formed on the inside wall of the contact piece posting holes 3f. These claws latch onto holes formed on the protruded pieces 13a.

In the moderator 4, an elastic claw 4c that engages to the notch 1h of the shaft rod 1a, and a rotation prevention protruded part 4d that is inserted into the groove 1i formed in the axial direction on the shaft rod 1a are formed toward the inside of the cylinder part 4a. Multiple moderator grooves are formed on the fan-shaped moderator plate 4b on a side facing the movable plate 3, against which the steel ball 11 is pressed. The moderator plate 4b is placed between the two stoppers 3c. As the movable plate 3 is rotated, the stoppers 3c engage the side walls 4b1 and 4b2, limiting the rotating ranges of the movable plate 3 and the knob 5.

The knob 5 is an operating component of a rotary switch, such as a front-light switch, a wiper volume, or a rear-wiper switch. The knob 5 is set on the tip of the shaft rod 1a in a freely rotatable manner. Rotation of the knob 5 is guided by the ring-shaped latching part 5a, to which the latching pieces 3b are latched, and the step part 5c, which is inserted in a freely rotatable manner into the opening part if of the operating lever 1. Furthermore, the knob 5 can rotate with the movable plate 3 by engaging the latching pieces 3b and 3e with the latching parts 5a and 5b, respectively. Cap 14 is fitted onto the knob 5 by inserting the cap 14 into the opening part 5d at the tip side. Then, the claw 14a is latched onto the cylindrical edge part 5e.

The latching parts 5a, 5b and the latching pieces 3b, 3e can be of any shape, as long as claws or the like can latch the members together. The latching parts 5a, 5b, for example, can be through holes, blind holes, or step parts. Furthermore, the latching parts 5a, 5b and the latching pieces 3b, 3e can be prepared in a mutually reversed manner. In other words, the latching pieces 3b, 3e can be formed on the knob, while the latching parts 5a, 5b can be formed on the movable plate 3.

The stationary contact plates 8 comprising multiple conductor plates are tightly fastened onto the terminal plate 2.

Alternatively, stationary contact plates 8 printed on the terminal plate 2 as a print substrate can be used. Code wires 9 are lead to outside of the operating lever 1 through the groove 1i into which the rotation prevention protruded part 4d is fitted.

The spring 10 and the steel ball 11 are installed onto the moderator plate 4b of the moderator 4. Alternatively, the moderator grooves to which the steel ball 11 is pressed against can be set on the movable plate 3.

The constitution of a first embodiment of the present invention has been described above. An operation of the device will now be explained by referring to FIGS. 1 to 4 of the drawings.

One end of the code wires 9 is soldered onto the stationary contact plates 8. The other end of the code wires 9 is lead to the outside of the operating lever 1 via the groove 1i on the shaft rod 1a. The terminal plate 2 is inserted into the opening part if of the operating lever 1, and the rotation prevention notch 2b is fitted onto the protruded part 1e. By fitting the rotation prevention notch 2b onto the protruded part 1e, the terminal plate 2 is prevented from being rotated.

The movable contact plate 13 is set on the movable plate 3 via the contact springs 12. The spring 10 and the steel ball 11 are inserted into the blind hole 3d in the movable plate 3. The cylinder part 4a of the moderator 4 is inserted into the through hole 3a in the movable plate 3. The moderator place 4b of the moderator 4 is placed between the two stoppers 3c. The rotation range of the movable plate 3 is limited as the stoppers 3c engage the side surfaces 4b 1, 4b2 of the moderator plate 4b when the movable plate 3 is rotated.

The cylinder part 4a of the moderator 4 is fitted onto the shaft rod 1a, the elastic claw 4c is latched onto the notch 1h, and the rotation prevention protruded part 4d is fitted into the groove 1i. By so doing, the moderator 4 is set on the shaft rod 1a of the operating lever. And, the terminal plate 2 and the movable plate 3 are held in a freely rotatable manner by being sandwiched between the receiving seat 1g of the operating lever 1 and the moderator plate 4b of the moderator 4.

The latching part 5a of the knob 5 is latched onto both the shaft rod 1a and the latching piece 3b, and the latching part 5b is latched onto the latching piece 3e. And, the step part 5c is fitted into the opening part If of the operating lever 1. As a result, the knob 5 rotates with the movable plate 3 by being guided by the opening part 1f or by the shaft rod 1a. In the knob 5, the cap 14 is inserted into the opening end 5d, and the claws 14a are latched onto the cylindrical edge parts 5e. Then, the opening end 5d is closed. In the operating lever 1, the moderator pin 6 and the coil spring 7 are inserted into the blind hole 1b. Then, the operating lever 1 is set on the switch body of the turn signal switch or the like.

The knob switch is thus completely assembled. In the automobile knob switch, according to the first embodiment of the present invention, the knob switch is assembled by inserting the entire components, including a moderator pin 6, a coil spring 7, an operating lever 1, code wires 9, a terminal plate 2, stationary contact plates 8, a movable contact plate 13, contact springs 12, a movable plate 3, a spring 10, a steel ball 11, a moderator 4, a knob 5, and a cap 14 in the axial direction of the shaft rod 1a. Thus, the processability of the assembling work is improved, and parts can be automatically assembled with machines. Thus, the assembling process is suitable for mass production.

Simply by pushing the knob 5 toward the movable plate 3, the latching part 5a can be latched onto the latching pieces 3b and onto the shaft rod 1a, and the knob 5 can be fitted onto the movable plate 3 as the latching part 5a is engaged with the latching piece 3e. Thus, the processability is good. As the knob 5 is rotated, being guided by the shaft rod 1a and the opening part if, the front light switch, for example, can be turned either ON or OFF.

Figure 5:
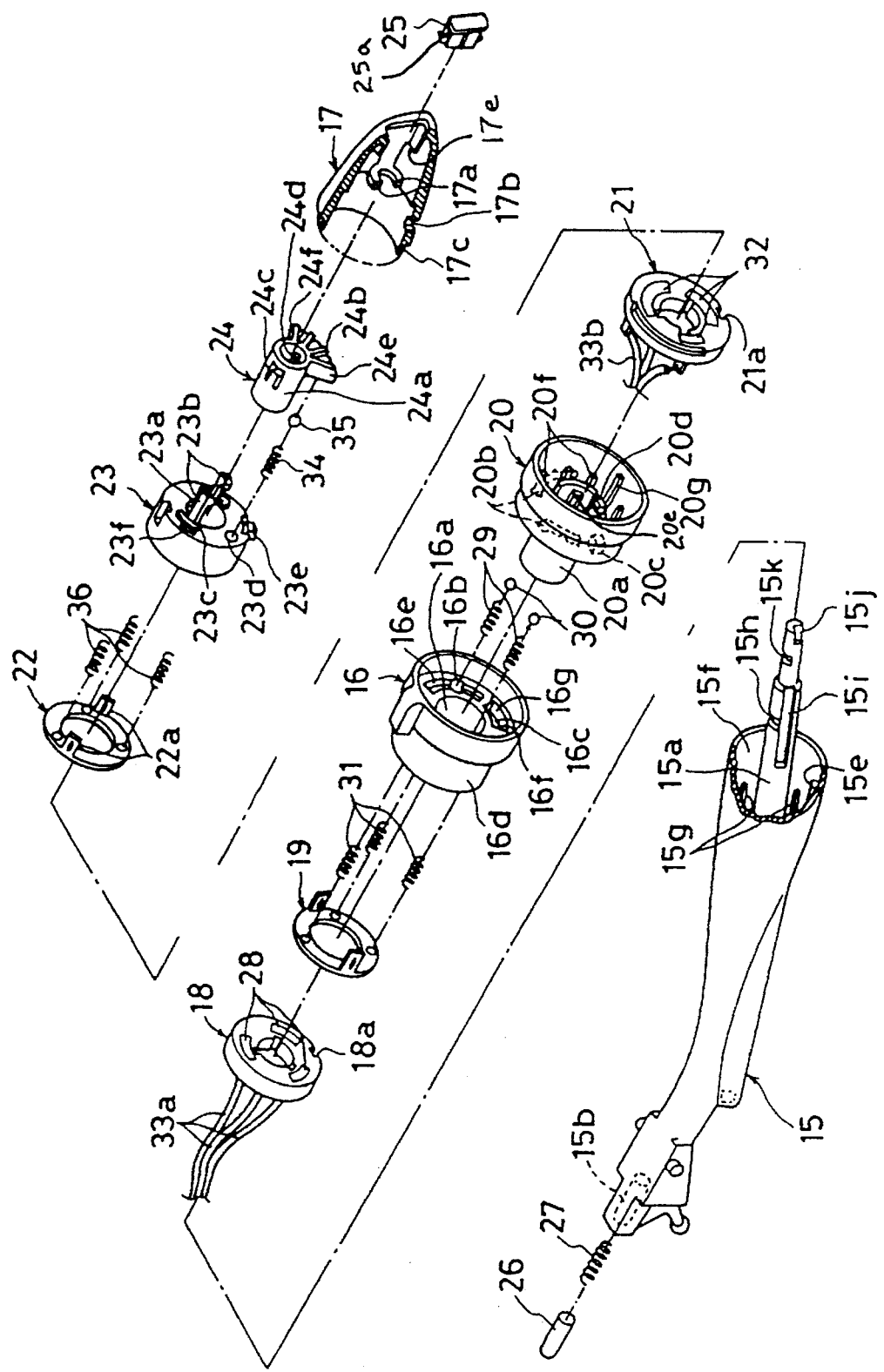
FIG. 5 is an exploded perspective view of component items of a second embodiment of the present invention.
Figure 6:
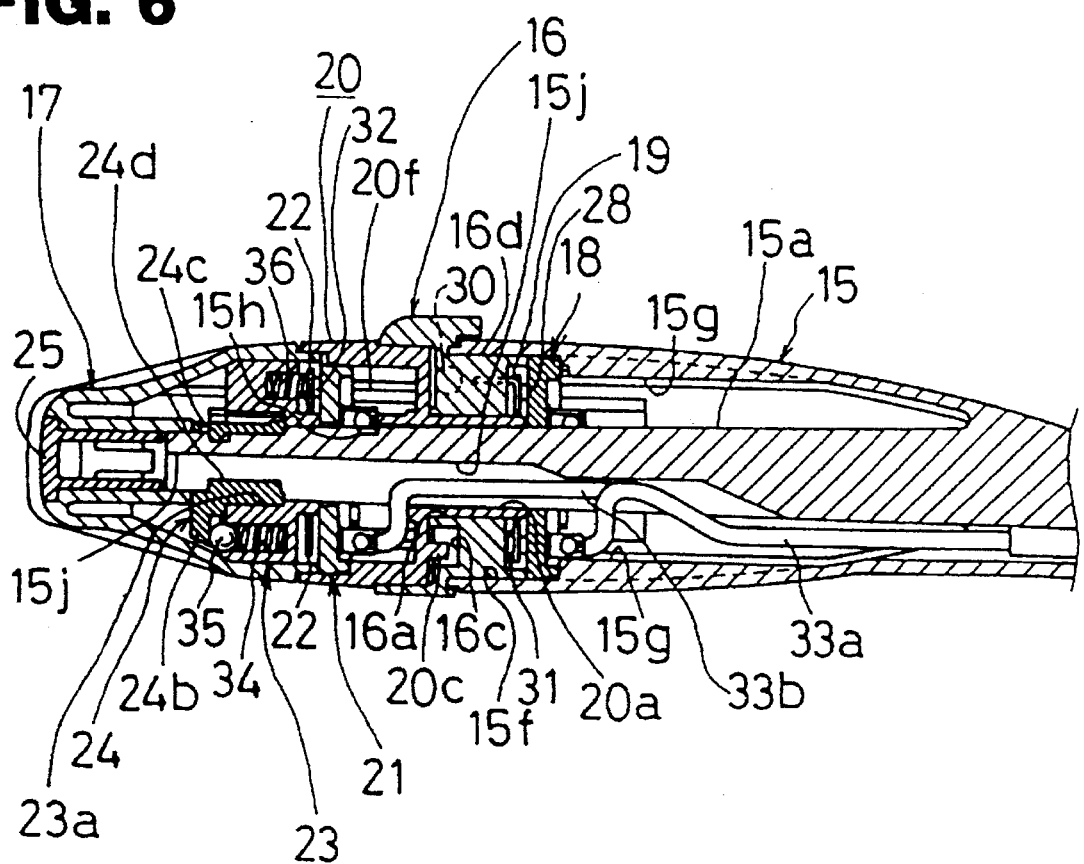
FIG. 6 is an enlarged cross-sectional diagram showing the second embodiment of the present invention.
Figure 7:
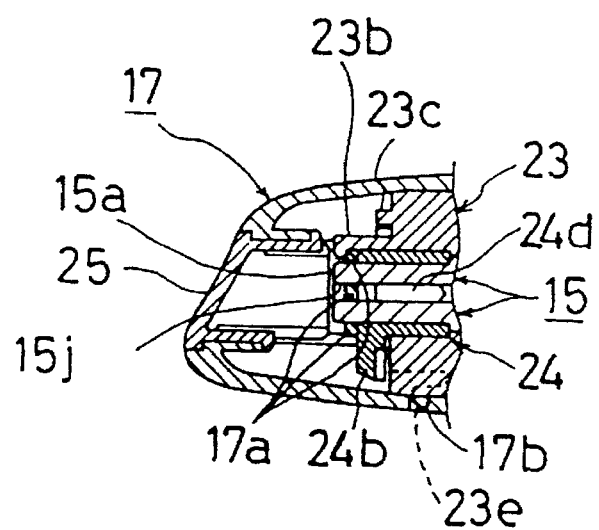
FIG. 7 is an enlarged cross-sectional diagram showing the second knob assembly of the second embodiment of the present invention.

A second embodiment of the present invention will be described in detail hereinafter with reference to FIGS. 5 to 7 of the accompanying drawings.

In the second embodiment of the present invention, two knobs of a rotary switch are installed at the tip of the operating lever 15.

Similar to the first embodiment of the invention described above, the operating lever 15 is an operating lever of an automobile turn signal switch and a dimmer switch, for instance. As an example, the operating lever of the second embodiment of the present invention is used as an operating component of a turn signal switch and a dimmer switch. Alternatively, the operating lever 15 can be used as an operating component of a wiper switch.

A shaft rod 15a on which the first terminal plate 18, the first movable contact plate 19, the first knob 16, the stationary body 20, the second terminal plate 21, the second movable contact plate 22, the movable plate 23, the moderator 24, the second knob 17, and the cap 25 are set is formed on one end of the operating lever 15, while a blind hole 15b to which the moderator pin 26 and the coil spring 27 are inserted is formed on the other end of the operating lever 15. In the shaft rod 15a, a groove 15j is formed at the lower part of the shaft rod 15a for insertion of code wires 33a, 33b and the rotation prevention protruded part 24d.

The first terminal plate 18 has the same shape as the terminal plate 2 described in the first embodiment. The first stationary contact plates 28 are tightly fastened onto the surface of the first terminal plate 18. Code wires 33a are soldered onto the rear side of the first stationary contact plates 28. Rotation of the first terminal plate 18 is prevented by engaging the rotation prevention notch 18a formed on the periphery of the first terminal plate 18 with the protruded part 15e formed on the inside wall of the operating lever 15. When the first terminal plate 18 is inserted into the opening part 15f of the operating lever 15, the rear surface of the first terminal plate 18 is received by the receiving seats 15g formed on the inside wall of the operating lever 15.

The doughnut-shaped first knob 16 having a hole 16a for insertion of the cylinder part 20a of the stationary body 20 is, for example, a fog lamp switch for turning on or off the fog lamp. Blind holes 16b for insertion of the springs 29 and the steel balls 30 and a rotation range regulating hole 16c for fitting the stopper 20c of the stationary body 20 are prepared on the surface of the first knob 16. As the first knob 16 is rotated, the side walls 16f, 16g of the rotation range regulating hole 16c engage the stopper 20c. Thus, the rotation range of the first knob 16 is regulated.

The first contact plate 19 is placed on the rear surface of the first knob 16 via multiple contact springs 31. A small diameter part 16d that is to be fitted into the opening part 15f of the operating lever 15 in a freely rotatable manner is formed on the periphery of the first knob 16. In addition, circular arc-shaped grooves 16e are formed on both sides of the blind holes 16b in the circumferential direction. Projections that form the moderator grooves 20b can be fitted into the circular arc-shaped grooves 16e in a freely rotatable manner. The first knob 16 can also be used to actuate a rear wiper switch or wiper volume (intermittent control).

In the stationary body 20, an elastic claw 20d and a mountain-shaped protruded part 20e are formed toward the inside of the opening edge at the front surface side of the cylinder part 20a. The elastic claw 20d is latched onto the first notch 15h of the shaft rod 15a. The mountain-shaped protruded part 20e is pressed on the notch 15i formed on the shaft rod 15a in the axial direction. Receiving seats 20f for supporting the second terminal plate 21 and a protruded part 20g to which the rotation prevention notch 21a of the second terminal plate 21 is to be fitted are formed on the inside wall of the stationary body 20.

The second stationary contact plates 32 are formed on the front surface of the second terminal plate 21, while code wires 33b connected to the second stationary contact plates 32 are placed at the rear surface of the second terminal plate 21. A print substrate can be used as a second terminal plate 21. Alternatively, the second terminal plate 21 and the stationary body 20 can be formed as an integrated solid body. The code wires 33b are inserted into the groove 15j formed on the shaft rod 15a in the axial direction, and are lead to the outside of the operating lever 15.

The doughnut-shaped movable plate 23, whose shape is similar to that of the movable plate 3 described in the first embodiment, has a through hole 23a for insertion of the cylinder part 24a of the moderator 24. Latching pieces 23b, stoppers 23c, and a blind hole 23d are formed on the surface of the movable plate 23. The latching pieces 23b are latched onto the outside of a ring-shaped latching part 17a installed on the inside of the second knob 17, and are axially engaged with the tip part of the shaft rod 15a. The edges of the moderator plate 24b of the moderator 24 engages the stoppers 23c. The blind hole 23d is for insertion of a spring 34 and a steel ball 35.

The second movable contact plate 22 is placed at the rear surface of the movable plate 23 via multiple contact springs 36. A latching piece 23e that is to be latched onto the latching part 17b is formed on the periphery of the movable plate 23. The latching part 17b is prepared on the second knob 17. In the movable plate 23, contact piece posting holes 23f are prepared at the outside of the aforementioned stopper 23c. The protruded pieces 22a of the second movable contact plate 22 are to be inserted into these contact piece posting holes 23f. Claws (not shown in the figures) on which the holes formed on the protruded pieces 22a are to be latched are formed on the inside walls of the contact piece posting holes 23f.

The shape of the moderator 24 is similar to that of the moderator 4 described in the first embodiment. An elastic claw 24c, which engages with the second notch 15k of the shaft rod 15a, and a rotation prevention protruded part 24d, which is fitted into the groove 15j formed on the shaft rod 15a in the axial direction, are formed on the moderator 24 toward the inside of the cylinder part 24a. Multiple moderator grooves to which the steel ball 35 is pressed are formed on the surface of the fan-shaped moderator plate 24b at the side of the movable plate 23. The moderator plate 24b is placed between the two stoppers 23c. As the movable plate 23 is rotated, the stoppers 23c engage the side surfaces 24e, 24f. Thus, the rotation ranges of the movable plate 23 and of the second knob 17 are regulated.

The second knob 17 is an operating component of a rotary switch, such as, for example, a front light switch or a wiper volume (intermittent control). The second knob 17 is axially fitted onto the tip of the shaft rod 15a. The second knob 17 is rotated through the guidance of the ring-shaped latching part 17a on which the latching pieces 23b are latched and of the step part 17c that is inserted into the opening part 15f of the operating lever 15 in a freely rotatable manner. In addition, the second knob 17 rotates with the movable plate 23 as the latching pieces 23b, 23e are latched onto the latching parts 17a, 17b. A cap 25 is inserted into the opening edge 25d at the tip of the second knob 17. The cap 25 is fitted onto the second knob 17 by latching the claws 25a onto the cylindrical edge part 17e. Shapes of the second knob 17 and the cap 25 are similar to those described in the first embodiment.

The constitution of the second embodiment of the present invention has been described above. The operation of the second embodiment will now be explained by referring to FIGS. 5 to 7.

One end of the code wires 33a is soldered onto the first stationary contact plates 28. The other end of the code wires 33a is lead to the outside of the operating lever 15 via the groove 15j formed on the shaft rod 15a. The first terminal plate 18 is inserted into the opening part 15f of the operating lever 15, and the rotation prevention notch 18a is fitted into the protruded part 15e. As the rotation prevention notch 18a is fitted into the protruded part 15e, the first terminal plate 18 is prevented from rotation.

The first movable contact plate 19 is installed on the first knob 16 via the contact springs 31. The springs 29 and the steel balls 30 are inserted into the blind holes 16b formed on the first knob 16, and the cylinder part 20a is inserted into the hole 16a. Then, the stopper 20c is placed in the rotation range regulating hole 16c in the first knob 16. The rotation range of the first knob 16 is regulated as the stopper 20c engages the side walls 16f, 16g of the rotation range regulating hole 16c.

The cylinder part 20a of the stationary body 20 is fitted onto the shaft rod 15a, and the elastic claw 20d is fitted into the groove 15j as the mountain-shaped protruded part 20e is pressed against the notch 15i. In this manner, the stationary body 20 is axially set onto the shaft rod 15a of the operating lever 15.

One end of the code wires 33b is soldered onto the second stationary contact plates 32 of the second terminal plate 21. The end of the code wires 33b is lead to the outside of the operating lever 15 via the groove 15j formed on the shaft rod 15a. Since the code wires 33b are placed in the groove 15j on the shaft rod 15a, rotation of the first knob 16 will not be impeded by these code wires 33b. The second terminal plate 21 is inserted into the opening part 15f of the operating lever 15, and the rotation prevention notch 21a is fitted onto the protruded part 20g. As the rotation prevention notch 21a is fitted onto the protruded part 20g, rotation of the second terminal plate 21 is prevented.

The second movable contact plate 22 is installed on the movable plate 23 via the contact springs 36. A spring 34 and a steel ball 35 are inserted into the blind hole 23d in the movable plate 23, and the cylinder part 24a of the moderator 24 is inserted into the through hole 23a in the movable plate 23. The moderator plate 24b of the moderator 24 is placed between the two stoppers 23c. In this manner, the rotation range of the movable plate 23 is regulated as the stoppers 23c engage the side surfaces 24e, 24f of the moderator 24.

The cylinder part 24a of the moderator 24 is fitted into the shaft rod 15a, the elastic claw 24c is engaged with the second notch 15k, and the rotation prevention protruded part 24d is fitted into the groove 15j. In this manner, the moderator 24 is axially set on the shaft rod 15a of the operator lever 15. The first terminal plate 18, the first knob 16, the stationary body 20, the second terminal plate 21, and the movable plate 23 are held by being sandwiched between the receiving seat 15g of the operating lever 15 and the moderator plate 24b of the moderator 24.

The latching part 17a of the second knob 17 is engaged with the latching pieces 23b and the tip of the shaft rod 15, the latching part 17b is latched onto the latching piece 23e, and the step part 17c is fitted into the opening part 15f of the operating lever 15. Thus, the second knob 17 can rotate with the movable plate 23 through the guidance of the opening part 15f and the shaft rod 15a. The opening part at the tip of the second knob 17 is sealed with the cap 25.

The operating lever 15 is axially set on the switch body of the turn signal switch by inserting the moderator pin 26 and the coil spring 27 into the blind hole 15b.

The knob switch is thus completely assembled. In the automobile knob switch, according to the second embodiment of the present invention, the knob switch is assembled by inserting the entire components, including a moderator pin 26, a coil spring 27, an operating lever 15, code wires 33a, the first terminal plate 18, the first stationary contact plates 28, the first movable contact plate 19, contact springs 31, the first knob 16, springs 29, steel balls 30, a stationary body 20, code wires 33b, the second terminal plate 21, the second stationary contact plates 32, contact springs 36, a movable plate 23, a spring 34, a steel ball 35, a moderator 24, the second knob 17, and a cap 25 in the axial direction of the shaft rod 15a. Thus, the processability of the assembling work is improved and the parts can be automatically assembled with machines. Thus, the assembling process is suitable for mass production.

Since the groove 15j, where the code wires 33a, 33b are placed and the rotation prevention protruded part 24d of the moderator 24 is engaged, is formed on the shaft rod 15a that is integrated into the operating lever 15, the rotation of the first knob 16, the second knob 17, and the movable plate 23 will not be impeded by the wiring of the code wires 33a, 33b. Thus, the groove 15j can be utilized effectively. Furthermore, in the second knob 17 installed at the tip of the operating lever 15, the latching part 17b is latched onto the latching piece 23e by fitting the second knob 17 into the movable plate 23. Thus, the second knob 17 can be easily assembled by a single touch with the movable plate 23. As a result, the number of assembly steps and the number of component items can be reduced.

In the operation of the second knob 17, the second knob 17 is rotated through the guidance of the shaft rod 15a and the opening part 15f, and the front-light switch is turned ON, for example, as the second movable contact plate 22 contacts the second stationary contact plates 32.

In the operation of the first knob 16, the first knob 16 is rotated through the guidance of the shaft rod 15a and the opening part 15f, and the fog lamp switch is turned ON, for example, as the first movable contact plate 19 contacts the first stationary contact plates 28.

Since the invented switch is constituted as described thus far, the following effects can be obtained.

(1) An automobile knob switch comprises an operating lever having a shaft rod, a terminal plate inserted into the opening part of the operating lever, a movable plate having a movable contact point that contacts the stationary contact plates placed on the terminal plate, a through hole through which the cylinder part of a moderator is inserted, and latching pieces with which the movable plate is latched onto the knob, the moderator having an elastic claw with which the moderator is fitted onto the shaft rod, and the knob having latching parts to which the latching piece of the movable plate is engaged. Thus, a knob can be easily installed by a single touch on a movable plate, the number of component items and the number of processing steps can be reduced, and the assembling of parts can be done mechanically.

(2) An automobile knob switch comprises a first terminal plate that has the first stationary contact plates and is inserted into the opening part of the operating lever, a first knob having a first movable contact plate that contacts the first stationary contact plates, a stationary body that is fitted onto the shaft rod of the operating lever, a second terminal plate that has the second stationary contact plates and is set on the stationary body, a movable plate that has the second movable contact plate that contacts the second stationary contact plates and latching pieces and is pivoted onto the shaft rod in a freely rotatable manner, a moderator claw having an elastic claw for latching onto the shaft rod, and a second knob having a latching part for latching onto the latching pieces of the movable plate. Thus, a second knob can be easily installed by a single touch in a movable plate, and the processability can be improved.

(3) Furthermore, a moderator has a rotation prevention protruded part in the cylinder part into which the shaft rod is inserted, the terminal plate or the second terminal plate has code wires connected either to the stationary contact plates or to the second stationary contact plate, the shaft rod has grooves, and the rotation prevention protruded part and the code wires are inserted into the grooves. Thus, the code wires connected to the terminal plates can be lead to outside of the operating lever, and the rotation of the stationary body and the moderator can be prevented with the rotation prevention protruded part.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

I claim:

1. An automobile knob switch, comprising:
    an operating lever having a shaft rod;
    a terminal plate inserted into an opening part of said operating lever, said terminal plate having stationary contact plates formed thereon;
    a moderator having a cylinder part;
    a movable plate having a movable contact plate that contacts the stationary contact plates formed on said terminal plate, a through hole through which the cylinder part of said moderator is inserted, and latching pieces;
    said moderator having an elastic claw with which the moderator is fitted onto the shaft rod; and
    a knob having latching parts to which the latching pieces of said movable plate are engaged.

2. The automobile knob switch according to claim 1, wherein said moderator has a rotation prevention protruded part in the cylinder part into which said shaft rod is inserted, said terminal plate has code wires connected to the stationary contact plates, said shaft rod has grooves, and said rotation prevention protruded part and said code wires are inserted into the grooves.

3. An automobile knob switch, comprising:
    an operating lever having a shaft rod;
    a first terminal plate that has first stationary contact plates and is inserted into an opening part of said operating lever;
    a first knob having a first movable contact plate that contacts said first stationary contact plates;
    a stationary body that is fitted onto the shaft rod of said operating lever;
    a second terminal plate that has second stationary contact plates and is set on said stationary body;
    a moderator having a cylinder part and an elastic claw for latching onto said shaft rod;
    a movable plate that has a second movable contact plate that contacts said second stationary contact plates, a through hole through which the cylinder part of said moderator is inserted, and latching pieces, said movable plate being pivotally mounted onto said shaft rod in a freely rotatable manner; and
    a second knob having a latching part for latching onto the latching pieces of said movable plate.

4. The automobile knob switch according to claim 3, wherein said moderator has a rotation prevention protruded part in the cylinder part into which said shaft rod is inserted, said first terminal plate and said second terminal plate has code wires connected to the first stationary contact plates and the second stationary contact plates, respectively, said shaft rod has grooves, and said rotation prevention protruded part and said code wires are inserted into the grooves.

5. An automobile switch assembly, comprising:
    an operating lever having a first end for mounting the operating lever and a second end for supporting a knob switch, said second end having a hollow opening part and a shaft rod protruding from a center of the hollow opening part;
    a terminal plate inserted into said opening part of said operating lever, said terminal plate having stationary contact plates formed thereon;
    a movable plate having a movable contact plate that contacts said stationary contact plates, said movable plate having an axially extending through hole and latching pieces;
    a moderator having a cylinder part and a moderator plate part, said moderator plate part having a plurality of moderator grooves facing said movable plate, said cylinder part inserted into said axially extending through hole of said movable plate, an elastic claw being formed on said moderator, said shaft rod extending through an axial bore of said cylinder part of the moderator, and said elastic claw engaging a notch on said shaft rod; and
    a knob encompassing said moderator and said movable plate, said knob having latching parts to which the latching pieces of said movable plate are engaged, whereby said movable plate rotates upon rotation of said knob.

6. The automobile switch assembly according to claim 5, further comprising means for preventing rotation of said moderator relative to said operating lever.

7. The automobile switch assembly according to claim 5, wherein said terminal plate has code wires connected to the stationary contact plates, said shaft rod has at least one axially extending groove, and said code wires are inserted into said groove.

8. The automobile switch assembly according to claim 5, further comprising a spring-biased ball disposed between said movable plate and said moderator in engagement with said moderator grooves.

9. An automobile switch assembly, comprising:
    an operating lever having a first end for mounting the operating lever and a second end for supporting a knob switch, said second end having a hollow opening part and a shaft rod protruding from a center of the hollow opening part;
    a first terminal plate inserted into said opening part of said operating lever, said first terminal plate having first stationary contact plates formed thereon;

a first knob supporting a first movable contact plate that contacts said stationary contact plates, said first knob having an axially extending through hole;

a stationary body having a cylinder part received in the through hole of said first knob, an enlarged open part of said stationary body facing away from said first knob;

a second terminal plate inserted into said enlarged open part of said operating lever, said second terminal plate having second stationary contact plates formed thereon;

a movable plate having a second movable contact plate that contacts said second stationary contact plates, said movable plate having an axially extending through hole and latching pieces;

a moderator having a cylinder part and a moderator plate part, said moderator plate part having a plurality of moderator grooves facing said movable plate, said cylinder part of the moderator inserted into said axially extending through hole of said movable plate, an elastic claw being formed on said moderator, said shaft rod extending through an axial bore of said cylinder part of the moderator, and said elastic claw engaging a notch on said shaft rod; and a second knob encompassing said moderator and said movable plate, said second knob having latching parts to which the latching pieces of said movable plate are engaged, whereby said movable plate rotates upon rotation of said second knob.

10. The automobile switch assembly according to claim 9, further comprising means for preventing rotation of said moderator relative to said operating lever.

11. The automobile switch assembly according to claim 9, wherein code wires are connected to the first and second stationary contact plates, and said shaft rod has axially extending grooves through which said code wires are inserted.

12. The automobile switch assembly according to claim 9, further comprising a spring-biased ball disposed between said movable plate and said moderator in engagement with said moderator grooves.

* * * * *